United States Patent
Maekawa et al.

(10) Patent No.: US 6,935,014 B2
(45) Date of Patent: Aug. 30, 2005

(54) METHOD FOR FABRICATING A THIN FILM MAGNETIC HEAD

(75) Inventors: Kazuya Maekawa, Chuo-ku (JP); Akio Iijima, Chuo-ku (JP); Junichi Sato, Chuo-ku (JP); Hiroyuki Miyamoto, Chuo-ku (JP)

(73) Assignee: TDK Corporation, Tokyo (JP)

( * ) Notice: Subject to any disclaimer, the term of this patent is extended or adjusted under 35 U.S.C. 154(b) by 593 days.

(21) Appl. No.: 10/097,625

(22) Filed: Mar. 15, 2002

(65) Prior Publication Data

US 2002/0133935 A1 Sep. 26, 2002

(30) Foreign Application Priority Data

Mar. 26, 2001 (JP) ........................................ 2001-086757

(51) Int. Cl.⁷ .......................... G11B 5/127; H04R 31/00
(52) U.S. Cl. ................. 29/603.18; 29/603.07; 29/603.08; 29/603.12; 29/603.15; 29/603.16; 204/192.15; 216/39; 216/41; 360/122; 360/126; 360/317; 427/127; 427/128; 430/312; 430/316
(58) Field of Search ..................... 29/603.07, 603.08, 29/603.12, 603.15, 603.16, 603.18; 204/192.15; 216/39, 41; 360/122, 126, 317; 427/127, 128; 430/312, 316

(56) References Cited

U.S. PATENT DOCUMENTS

| | | | |
|---|---|---|---|
| 5,438,747 A | * | 8/1995 | Krounbi et al. .......... 29/603.16 |
| 5,665,251 A | * | 9/1997 | Robertson et al. ............ 216/22 |
| 6,156,487 A | | 12/2000 | Jennison et al. ............ 430/316 |
| 6,329,211 B1 | * | 12/2001 | Terunuma et al. ............. 438/3 |
| 6,539,610 B1 | * | 4/2003 | Lo et al. ................... 29/603.07 |

FOREIGN PATENT DOCUMENTS

| | | | | |
|---|---|---|---|---|
| JP | 11161915 A | * | 6/1999 | ............ G11B/5/31 |
| JP | 2000-132812 A | | 5/2000 | |

OTHER PUBLICATIONS

"Thin–film inductive heads for perpendicular recording"; Schewe, H.; Stephani, D.; Magnetics, IEEE Transactions on, vol.: 26, Issue: 6, Nov. 1990; pp.: 2966–2971.*

* cited by examiner

Primary Examiner—Dexter Tugbang
(74) Attorney, Agent, or Firm—Oliff & Berridge, PLC

(57) ABSTRACT

An electrode film and a protective electrode film are formed on an insulating film and a first magnetic film in turn. Then, a first photoresist layer, an intermediate layer and a second photoresist layer are formed on the protective electrode film in turn. The intermediate layer is formed by a sputtering method so that the surface temperature of the intermediate layer is set to 140° C. or below. Then, the first photoresist layer is exposed and developed, to fabricate a photoresist pattern. Then, the intermediate layer is partially etched and removed via the photoresist pattern as a mask by a reactive ion etching method using a chlorine-based gas.

20 Claims, 7 Drawing Sheets

METHOD FOR FABRICATING A THIN FILM MAGNETIC HEAD

BACKGROUND OF THE INVENTION

1. Field of the Invention

This invention relates to a method for forming a thin film, and a method for a thin film magnetic head using the forming method of thin film.

2. Related Art Statement

Conventionally, a writing magnetic pole portion of a thin film magnetic head is fabricated ad follows. First of all, a first magnetic film is formed on a given under layer, and a second magnetic film is formed on the first magnetic film via a gap film by a frame-plating method. Then, the gap film and the first magnetic film are trim-milled by using the second magnetic film as a mask, to form a trim-shaped writing magnetic pole portion.

In Japanese Patent Laid-open Publication No. Kokai Hei 2000-132812 (JP2000-132812) using the frame-plating method, such an attempt is made as to form a narrowed second magnetic film using a so-called three-layered resist, and thus, fabricate a narrowed writing magnetic pole portion.

In this case, an adhesive layer made of Ti or the like is formed on a gap layer, and then, an electrode film is formed on the adhesive layer. Thereafter, a first photoresist layer, an intermediate layer and a second photoresist layer having a thickness of 1 nm or below are formed in turn. Then, the second photoresist layer is exposed and developed with a mask, to fabricate a photoresist pattern having a minute opening. Then, the intermediate layer is partially etched by using the photoresist pattern as a mask, to fabricate an etching mask having a given opening.

Thereafter, the first photoresist layer is etched and removed by using the etching mask, to fabricate a photoresist frame. Then, the second magnetic film is formed in the photoresist frame by using the electrode film as an electrode.

In this case, the photoresist frame made of the first photoresist layer can be fabricated in self-alignment from the photoresist pattern made of the second photoresist layer. Therefore, the opening width of the photoresist frame can be set equal to the minute opening width of the photoresist pattern, and thus, the narrowed second magnetic film can be easily formed.

The intermediate layer is etched by a reactive ion etching (RIE) using oxygen gas. In this case, however, polymer debris may be created on the inner side surface and so on of the etching mask. The polymer debris can removed by using a solvent, but as a result, the etching mask itself may be damaged by the solvent. Therefore, the photoresist frame can not fabricated precisely, and thus, it is difficult to fabricate the writing magnetic pole portion by a frame-plating method.

The intermediate layer can be formed uniformly by a sputtering method. In this case, however, the first photoresist layer under the intermediate layer may be deteriorated, and thus, the photoresist frame can not fabricated in good condition by the etching process as mentioned above. Therefore, it is also difficult to fabricate the writing magnetic pole portion by the frame-plating method.

SUMMARY OF THE INVENTION

It is an object of the present invention to provide a new method for forming a thin film which can inhibit the creation of the polymer debris through the etching process for the intermediate layer and the deterioration of the photoresist frame at the formation of the intermediate layer, and thus preferably usable for fabricating a writing magnetic pole portion of a thin film magnetic head, and provide a method for fabricating a thin film magnetic head using the forming method of thin film magnetic head.

In order to attain the above object, this invention relates to a method for forming a thin film (first forming method of thin film), comprising the steps of:

forming an electrode film on a given base member, forming a first photoresist layer on said electrode film, forming an intermediate layer on said first photoresist layer, forming a second photoresist layer in a thickness of 1 μm or below on said intermediate layer, exposing and developing said second photoresist layer via a given mask so as to expose said intermediate layer, to fabricate a photoresist pattern, partially etching said intermediate layer via said photoresist pattern as a mask by a reactive ion etching method using a chlorine-based gas so as to expose said first photoresist layer, to fabricate an etching mask, partially etching said first photoresist layer via said etching mask so as to expose said electrode film, to fabricate a photoresist frame in self-alignment, forming a given thin film in said photoresist frame by an electroplating method using said electrode film, and removing said etching mask and said photoresist frame.

The inventors had intensely studied to attain the above object. As a result, in forming a thin film by a frame-plating method using a so-called three-layered resist, a chlorine-based gas such as Cl2 or BCl3 is used in place of a conventional oxygen gas, and then, the intermediate layer is partially etched and removed by RIE using the chlorine-based gas, to fabricate an etching mask for etching the first photoresist layer.

In this case, the intermediate layer can be etched at a practically usable etching rate due to the high corrosion of the chlorine-based gas, and also, even though polymer debris may be created on the side surface of the etching mask, it can be removed through washing using extrapure water because the polymer debris is made of chloride.

Therefore, a resist frame can be fabricated in good condition, and even though the three-layered resist is used, a narrowed thin film can be easily formed in good condition. The first forming method of thin film is invented on the above findings.

As the chlorine-based gas, at least one of $Cl_2$ and $BCl_3$ can be employed. Therefore, the intermediate layer can be partially etched and removed efficiently for a short period.

As mentioned above, even at employing the first forming method of thin film, polymer debris may be created on the side surface and so on of the etching mask. In this case, the etching mask may be washed by extrapure water after the etching mask is fabricated and before the photoresist frame is fabricated. That is, even though polymer debris is created on the side surface of the etching mask, it can be easily removed by extrapure water, according to the first forming method of thin film.

In a preferred embodiment of the first forming method, a protective electrode film is provided between the electrode film and the first photoresist layer. In this case, the corrosion of the electrode film can be effectively inhibited, and in forming the writing magnetic pole portion including the electrode film, the generation of writing noise can be inhibited. Also, the impossibility of forming a narrowed thin film using an electroplating method can be removed because the corrosion of the electrode film can be effectively inhibited. Moreover, the thickness of the protective electrode film is preferably set within 3–20 nm. In this case, the corrosion-resistance effect of the protective electrode film can be effectively exhibited. Similarly, the protective electrode film is made of a magnetic material including Ni and Fe.

The thickness of the electrode film is preferably set within 30–100 nm and made of a magnetic material including Co, Ni and Fe. In this case, the output power of the writing magnetic pole portion including the electrode film can be developed.

In another preferred embodiment of the first forming method of thin film, it is desired that the photoresist frame is removed by ashing treatment. In this case, the photoresist frame can be easily removed.

This invention also relates to a method for forming a thin film (second forming method of thin film), comprising the steps of:

forming an electrode film on a given base member,
forming a first photoresist layer on said electrode film,
forming an intermediate layer on said first photoresist layer by a sputtering method so that the surface temperature of said intermediate layer is set to 140° C. or below,
forming a second photoresist layer in a thickness of 1 µm or below on said intermediate layer,
exposing and developing said second photoresist layer via a given mask so as to expose said intermediate layer, to fabricate a photoresist pattern,
partially etching said intermediate layer via said photoresist pattern as a mask so as to expose said first photoresist layer, to fabricate an etching mask,
partially etching said first photoresist layer via said etching mask so as to expose said electrode film, to fabricate a photoresist frame in self-alignment,
forming a given thin film in said photoresist frame by an electroplating method using said electrode film, and
removing said etching mask and said photoresist frame.

The inventors had also intensely studied to found out the cause of the deterioration of the first photoresist layer. As a result, they found out that the deterioration is originated from the thermal damage from the plasma atmosphere in sputtering the intermediate layer. Then, they found out that the thermal damage is repressed by setting the surface temperature of the intermediate layer to 1400° C. or below. The second forming method of thin film is invented on the above findings.

In a preferred embodiment the second forming method of thin film, the distance between the base member and the target to be sputtered is set within 150–350 mm. Although the setting of the surface temperature of the intermediate layer to 1400° C. or below can be performed by controlling the pressure and/or input electric power, if the distance is set within the above range, the setting of the surface temperature can be easily performed.

In the second forming method of thin film as well as the first forming method of thin film, it is desired that a protective layer is provided between the electrode film and the first photoresist layer. In this case, too, the corrosion of the electrode film can be effectively inhibited. The thickness of the protective film is preferably set within 3–20 nm, as in the first forming method of thin film, and preferably made of a magnetic material including Ni and Fe.

In the second forming method of thin film, too, the thickness of the electrode film is preferably set within 30–100 nm, and preferably made of a magnetic material including Co, Ni and Fe. The photoresist frame is also preferably removed by ashing treatment.

The first forming method and the second forming method may be employed independently, respectively, and also may be employed in combination. In this case, the preferred embodiments of the first forming method and the second forming method may be combined appropriately.

A method for fabricating a thin film magnetic head (first fabricating method of thin film magnetic head) according to the present invention is characterized by fabricating a writing magnetic pole portion using the first forming method of thin film. That is, the first fabricating method comprises the steps of:

forming said first magnetic film on a given underfilm,
forming said gap film on said first magnetic film,
forming an electrode film on said gap film,
forming a first photoresist layer on said electrode film,
forming an intermediate layer on said first photoresist layer,
forming a second photoresist layer in a thickness of 1 µm or below on said intermediate layer,
exposing and developing said second photoresist layer via a given mask so as to expose said intermediate layer, to fabricate a photoresist pattern,
partially etching said intermediate layer via said photoresist pattern as a mask by a reactive ion etching method using a chlorine-based gas so as to expose said first photoresist layer, to fabricate an etching mask,
partially etching said first photoresist layer via said etching mask so as to expose said electrode film, to fabricate a photoresist frame in self-alignment,
forming said second magnetic film in said photoresist frame by an electroplating method using said electrode film,
removing said etching mask and said photoresist frame, and
partially etching said electrode film, said gap film and said first magnetic film via said second magnetic film as a mask, to fabricate said writing magnetic pole portion in self-alignment.

According to the first fabricating method of thin film magnetic head, in forming the second magnetic film constructing the writing magnetic pole portion through the frame-plating for the three-layered resist made of the first photoresist layer, the intermediate layer and the second photoresist layer, the creation of polymer debris on the side surface of the etching mask can be effectively inhibited, and thus, the photoresist frame can be fabricated in good condition. Therefore, the narrowed second magnetic film can be easily formed, and thus, the narrowed writing magnetic pole portion can be easily fabricated.

Also, a second fabricating method of thin film magnetic head is characterized by fabricating the writing magnetic pole portion using the second forming method of thin film. That is, the second fabricating method of thin film comprises the steps of:

forming said first magnetic film on a given underfilm,
forming said gap film on said first magnetic film,
forming an electrode film on said gap film,
forming a first photoresist layer on said electrode film,
forming an intermediate layer on said first photoresist layer by a sputtering method so that the surface temperature of said intermediate layer is set to 140° C. or below, forming a second photoresist layer in a thickness of 1 μm or below on said intermediate layer, exposing and developing said second photoresist layer via a given mask so as to expose said intermediate layer, to fabricate a photoresist pattern, partially etching said intermediate layer via said photoresist pattern as a mask so as to expose said first photoresist layer, to fabricate an etching mask, partially etching said first photoresist layer via said etching mask so as to expose said electrode film, to fabricate a photoresist frame in self-alignment, forming said second magnetic film in said photoresist frame by an electroplating method using said electrode film, removing said etching mask and said photoresist frame, and partially etching said electrode film, said gap film and said first magnetic film via said second magnetic film as a mask, to fabricate said writing magnetic pole portion in self-alignment.

According to the second fabricating method of thin film magnetic head, in forming the intermediate layer by a sputtering method, the first photoresist layer is not deteriorated, so that the photoresist frame can be fabricated in good condition through etching process. As a result, the narrowed second magnetic film can be easily made and thus, the narrowed writing magnetic pole portion can be easily fabricated.

The first fabricating method and the second fabricating method can be also employed independently, respectively, and may be employed in combination. In this case, the preferred embodiments of the first fabricating method and the second fabricating method may be also combined.

BRIEF DESCRIPTION OF THE DRAWINGS

For a better understanding of this invention, reference is made to the attached drawings, wherein.

DETAILED DESCRIPTION OF PREFERRED EMBODIMENTS

The other objects, configurations and advantages will be explained in detail, with reference to the attaching drawings in embodiments. However, it is to be understood that the invention is not intended to be limited to the specific embodiments. FIGS. 1–9 are cross sectional views showing the fabricating steps of a thin film magnetic head according to the present invention. Herein, for clarifying the characteristics of the present invention, in FIGS. 1–9, the dimensions of some components are different from the real ones.

Figure 1:
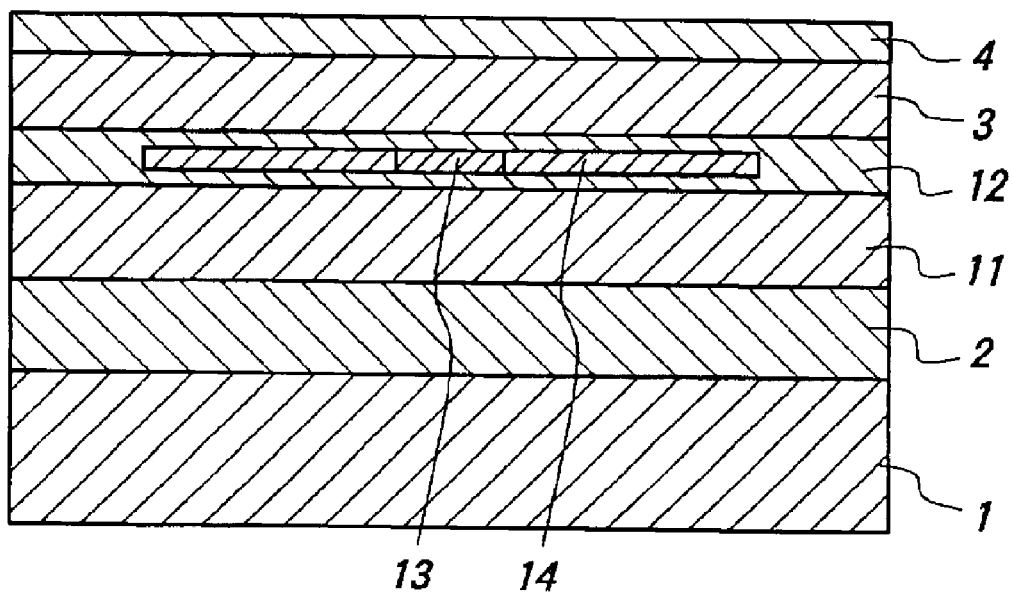
FIG. 1 is a cross sectional view showing a step in fabricating a thin film magnetic head using a fabricating method according to the present invention.

First of all, as shown in FIG. 1, an insulating film 2, a bottom shielding film 11 and an insulating film 12 are formed on a substrate 1 made of, e.g., AlTiC. Then, an MR element 13 and an MR lead 14 as a reading element is formed so as to be embedded in the insulating film 12. Then, a first magnetic film 3 and a gap film 4 are formed on the insulating film 12. The insulating film 2 is made in a thickness of 4–7 μm of an insulating material such as $Al_2O_3$ or $SiO_2$ by a sputtering method. The first magnetic film 3 is made in a thickness of 0.5–4 nm of a soft magnetic material such as NiFe, CoFe or CoNiFe by a sputtering method.

The gap film 4 is made in a thickness of 0.01–0.5 nm of an insulating material such as $Al_2O_3$ or $SiO_2$ by a sputtering method, and also made of a non-magnetic metallic material by a plating method.

Figure 2:
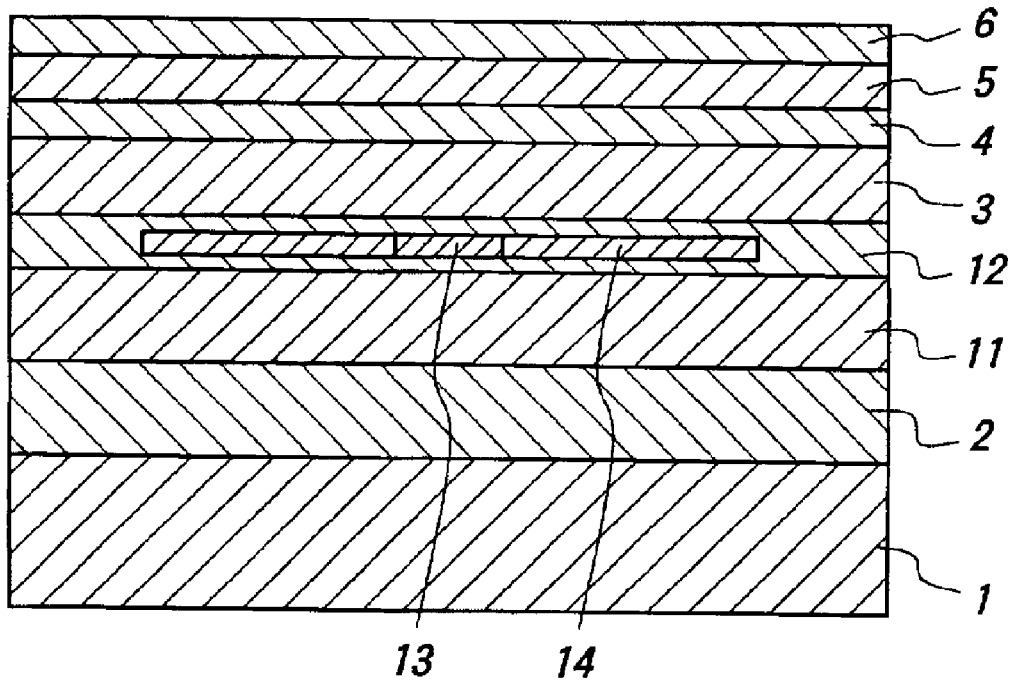
FIG. 2 is a cross sectional view showing a step after the step shown in FIG. 1.

Then, as shown in FIG. 2, an electrode film 5 and a protective electrode film 6 are formed on the gap film 4 via an adhesive layer (not shown). In order to perform a high power writing by using the writing magnetic pole portion later, the electrode film 5 is made in a thickness of 30–100 nm of a CoNiFe-based soft magnetic material of high magnetic flux by a sputtering method. In order to enhance the corrosion-resistance, the protective electrode film 6 is made in a thickness of 3–20 nm of a NiFe-based soft magnetic material such as $Ni_{80}Fe_{20}$ by a sputtering method.

The protective electrode film 6 is not essential in the present invention, but can give the corrosion to the electrode film 5 if provided, and thus, prevent the writing noise in the writing magnetic pole portion including the electrode film. Moreover, if the protective electrode film 6 is provided, the second magnetic film can be formed by an electroplating method in good condition because the corrosion of the electrode film 5 is inhibited.

Figure 3:
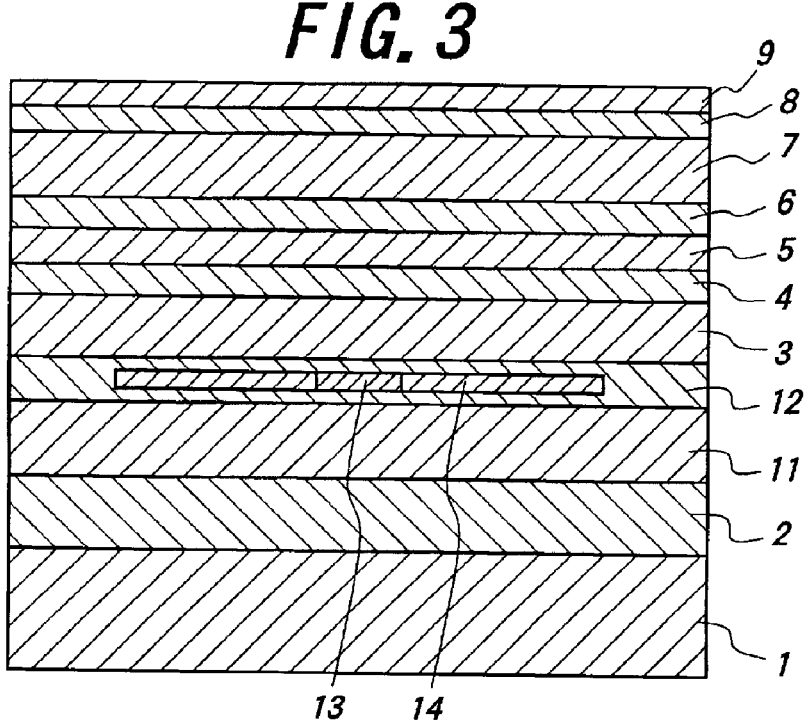
FIG. 3 is a cross sectional view showing a step after the step shown in FIG. 2.

Then, as shown in FIG. 3, a first photoresist layer 7, an intermediate layer 8 and a second photoresist layer 9 are formed on the protective electrode film 6 in turn. The first photoresist layer 7 is made in a thickness of 4.0–7.0 μm by a spin coating method. The intermediate layer 8 is made in a thickness of 50–100 nm of an insulating material such as $Al_2O_3$ or $SiO_2$ by a sputtering method. The intermediate layer 8 may be also made of a metallic material by a plating method. The second photoresist layer 9 is made in a thickness of 1 μm or below, preferably within 0.3–0.8 μm by a spin coating method.

If the first photoresist layer 7 is damaged by the thermal affect at the sputtering formation of the intermediate layer 8, the surface temperature of the intermediate layer 8 is set to 140° C. or below, according to the second fabricating method of the present invention.

The surface temperature can be set within the above temperature range by controlling the pressure and the input electric power at the sputtering formation. However, the surface temperature within the above temperature range can be preferably performed by setting the distance between the substrate and the target to be sputtered within 150–350 mm. In this case, the surface temperature range can be easily realized, irrespective of various sputtering conditions.

Figure 4:
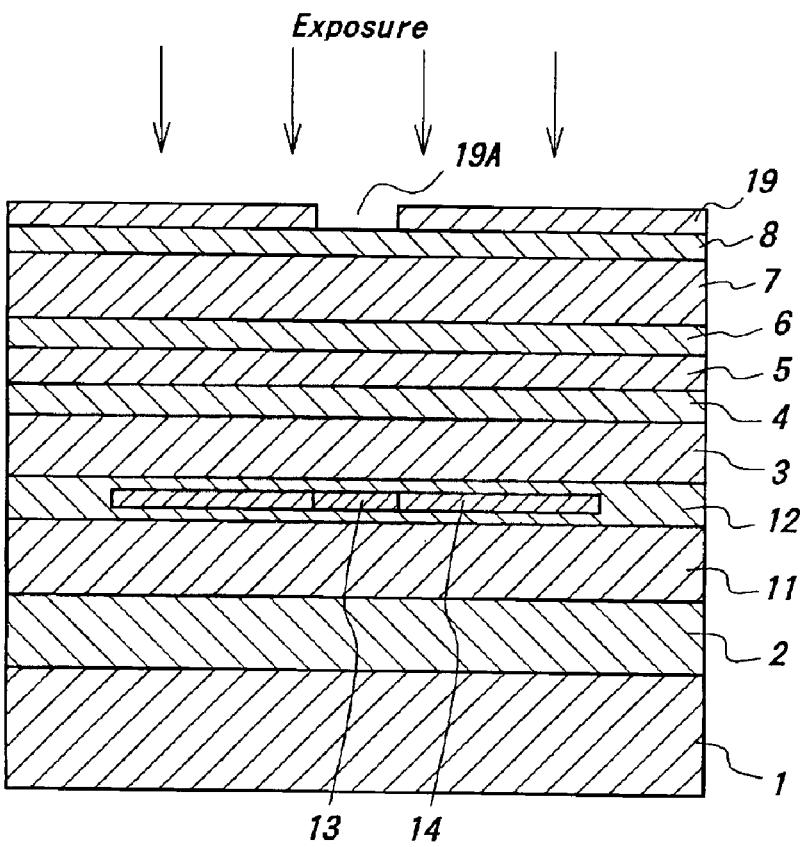
FIG. 4 is a cross sectional view showing a step after the step shown in FIG. 3.

Then, as shown in FIG. 4, the second photoresist layer 9 is exposed and developed, to fabricate a photoresist pattern 19 having a given opening 19A. Since the thickness of the second photoresist layer 9 is set to a minute value as mentioned above, the size of the opening 19A is set within 0.2–0.5 μm.

Figure 5:
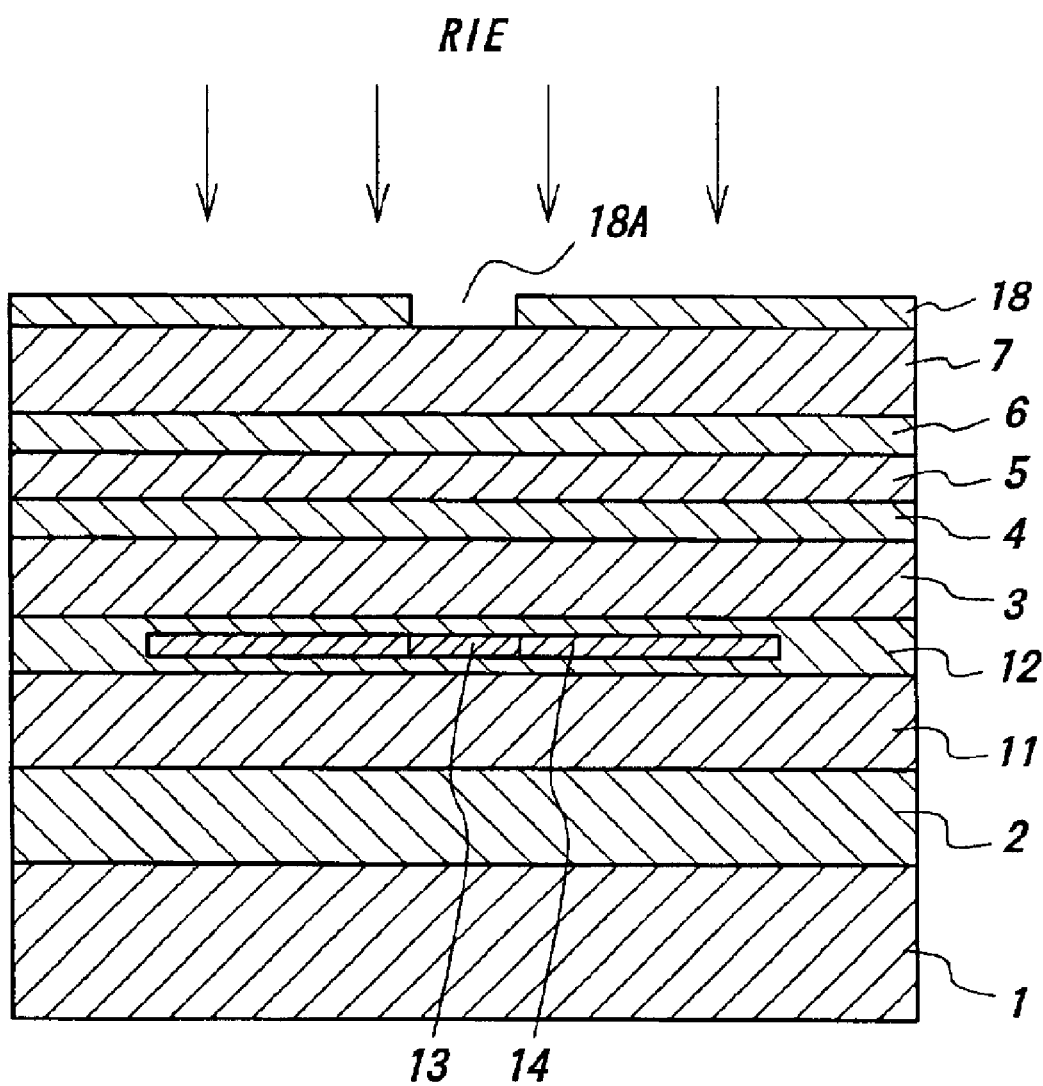
FIG. 5 is a cross sectional view showing a step after the step shown in FIG. 4.

Then, as shown in FIG. 5, the intermediate layer 8 is etched by using the photoresist pattern 19 as a mask, to fabricate an etching mask 18 for the first photoresist layer 7. Herein, the etching process may be performed by an RIE method using a chlorine-based gas or a mixed gas including the chlorine-based gas. A fluorine-based gas may be also employed.

In the case that polymer debris is created on the inner side surface 18B and so on of the etching mask 18, however, a chlorine-based gas such as $Cl_2$ or $BCl_3$ is preferably employed. In this case, the polymer debris can be removed by washing out the assembly including the etching mask 18 with extrapure water. In the RIE method, the plasma atmosphere is generated by using ECR.

The photoresist pattern 19 is diminished through the above etching process.

Figure 6:
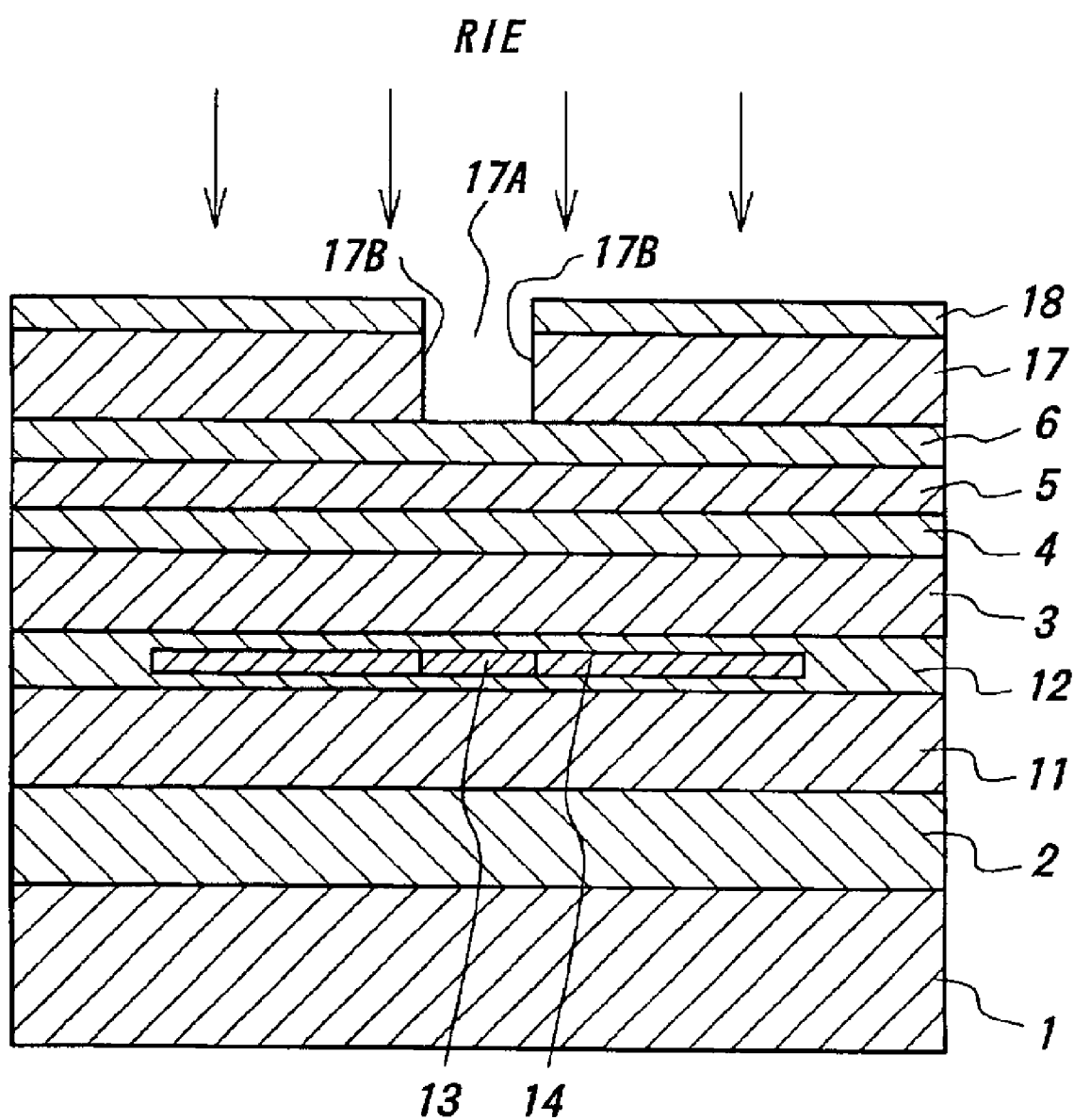
FIG. 6 is a cross sectional view showing a step after the step shown in FIG. 5.

Then, as shown in FIG. 6, the first photoresist layer 7 is partially etched by using the etching mask 18, to fabricate a photoresist frame 17. The etching process can be performed in the same manner as shown in FIG. 5. Herein, if a chlorine-based gas is employed, a side wall can be made on the inner side surface 17B of the photoresist frame 17 during the etching, and thus, the side etching for the photoresist frame 17 can be effectively prevented.

Herein, since the photoresist frame 17 is made from the photoresist pattern 19 in self-alignment, the size of the opening 17A is set within 0.2–0.5 μm almost equal to the size of the opening 19A of the photoresist pattern 19.

Figure 7:
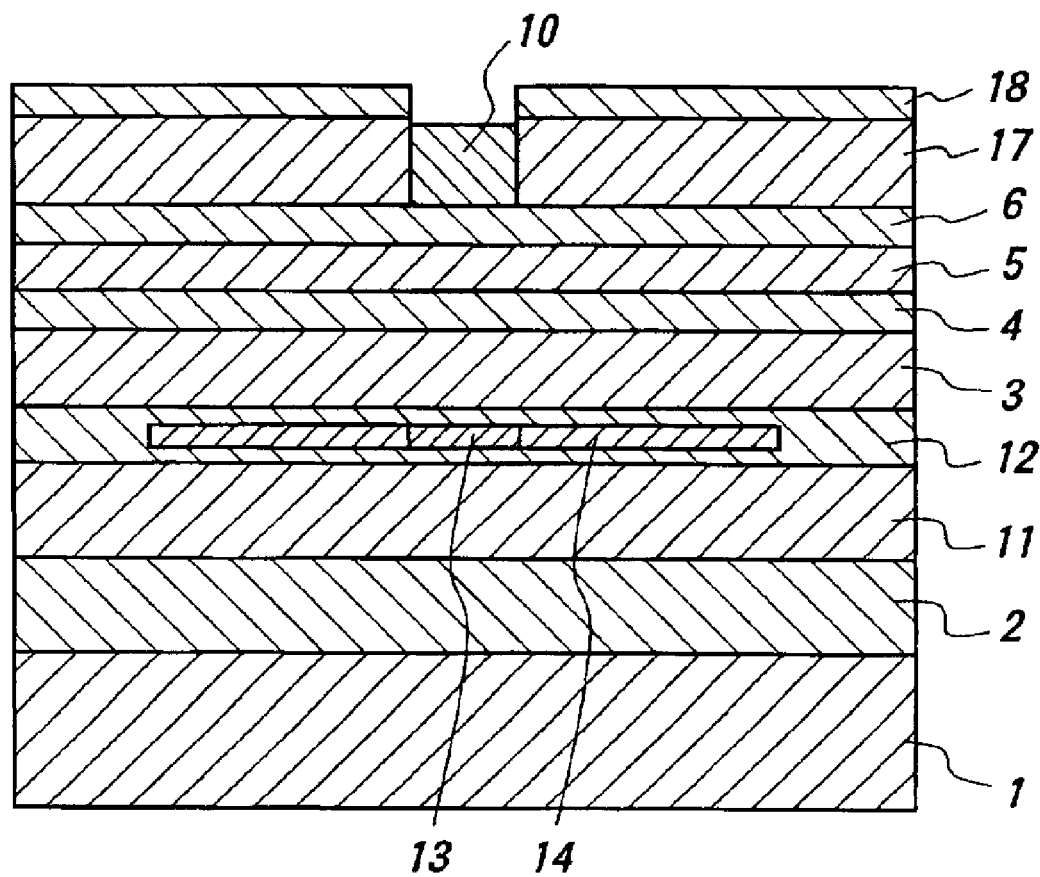
FIG. 7 is a cross sectional view showing a step after the step shown in FIG. 6.

Then, as shown in FIG. 7, a second magnetic film 10 is formed in a thickness of 3–5 μm in the opening 17A of the photoresist frame 17 by an electroplating method using the electrode film 5 and the protective electrode film 6 as electrodes. Therefore, the narrowed second magnetic film can be formed according to the present invention.

Figure 8:
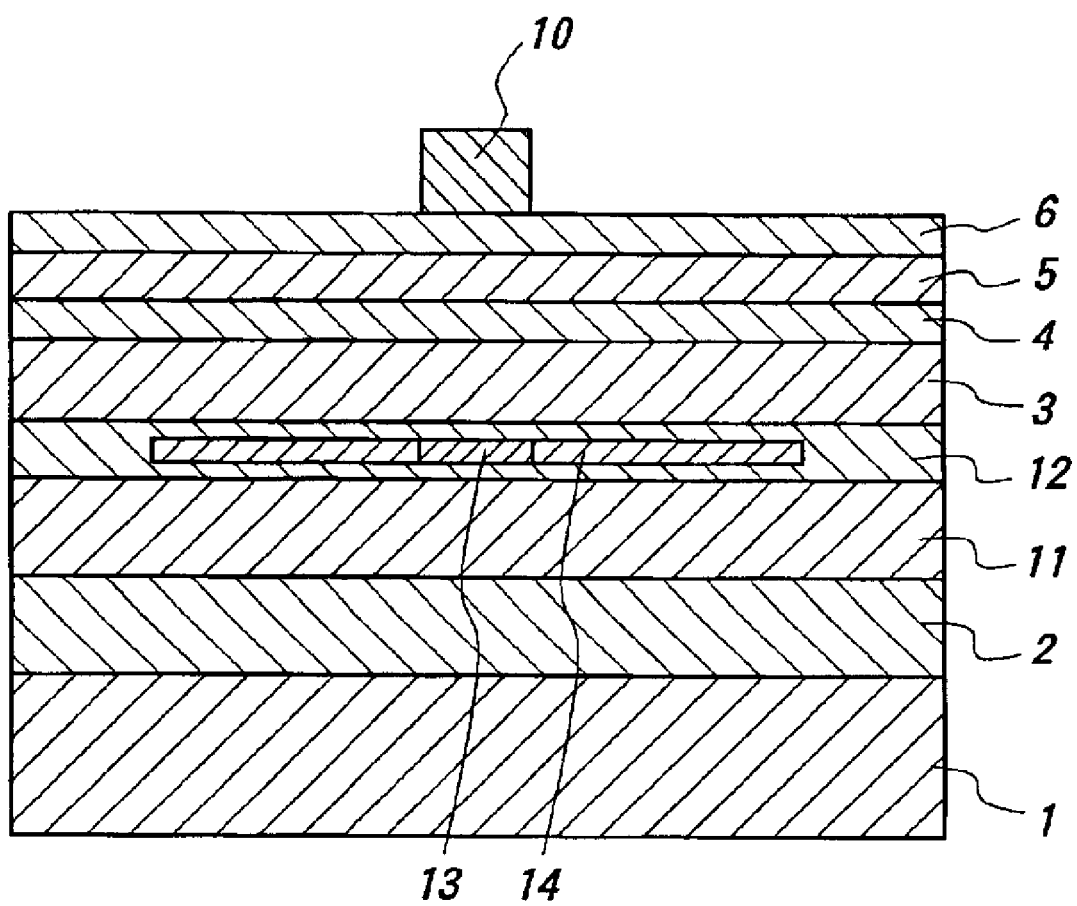
FIG. 8 is a cross sectional view showing a step after the step shown in FIG. 7.

Then, as shown in FIG. 8, the etching mask 18 is removed by an RIE method, and the photoresist frame 17 is removed by ashing. The resist debris is removed with a resist removing solution. Herein, the term "ashing" means to incinerate and remove organic thin film component by using oxygen plasma.

Figure 9:
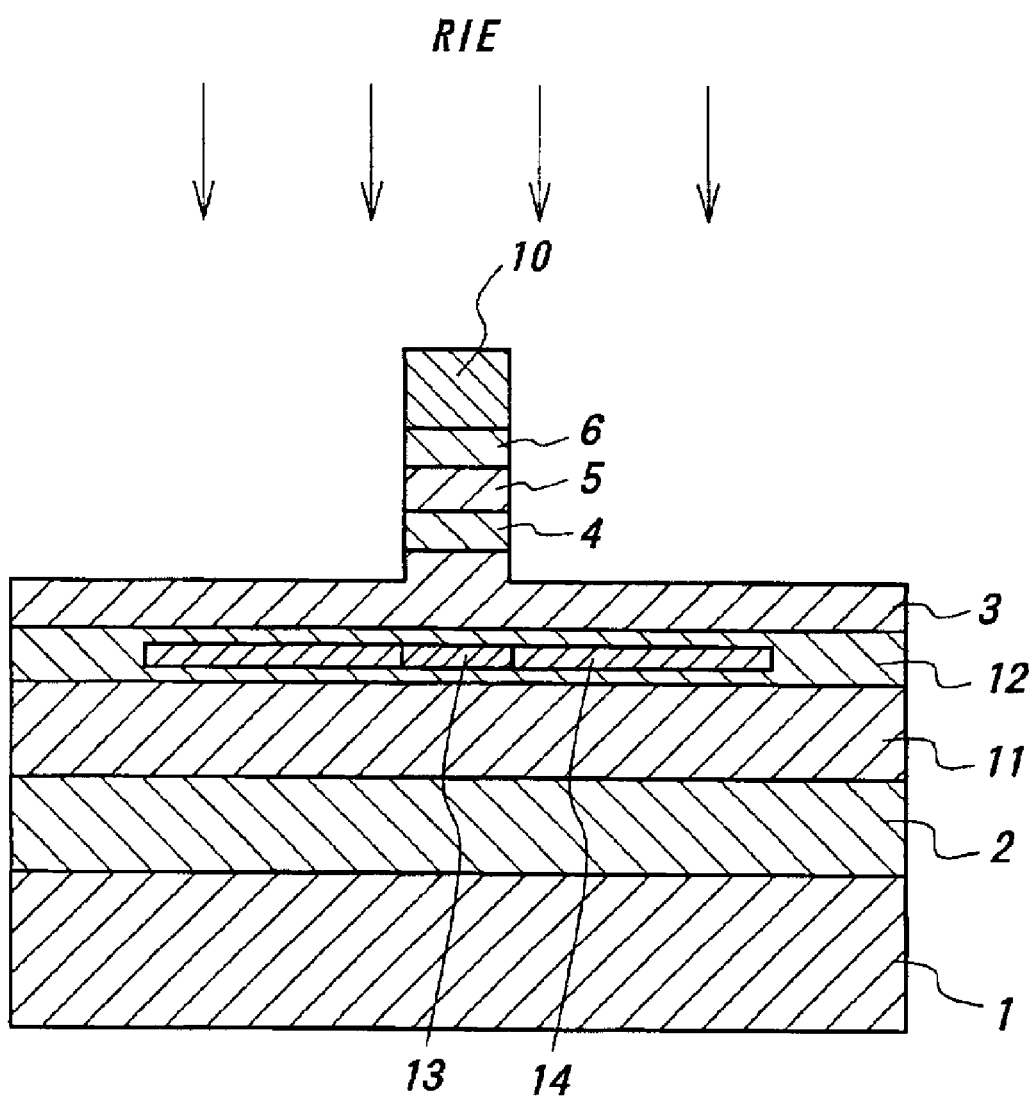
FIG. 9 is a cross sectional view showing a step after the step shown in FIG. 8.

Then, as shown in FIG. 9, the protective electrode film 6, the electrode film 5 and the gap film 4 are partially etched and removed, and the first magnetic film 3 is partially etched in the thickness direction, to fabricate a trim-shaped writing magnetic pole portion.

Although the present invention was described in detail with reference to the above examples, this invention is not limited to the above disclosure and every kind of variation and modification may be made without departing from the scope of the present invention. In the above embodiment, for example, only the writing magnetic pole portion is fabricated on the substrate, and thus, only the thin film magnetic head for writing is fabricated, but a reading element is fabricated on the substrate in addition to the writing element, and thus, a composite type thin film magnetic head may be fabricated.

As mentioned above, according to the fabricating method of thin film magnetic head using the forming method of thin film of the present invention, a narrowed second magnetic film can be easily formed, and thus, a narrowed writing magnetic pole portion can be easily fabricated.

What is claimed is:

1. A method for fabricating a thin film magnetic head which comprises a writing magnetic pole portion including a first magnetic film, a gap film and a second magnetic film, comprising the steps of:

forming said first magnetic film on a given underfilm,
forming said gap film on said first magnetic film,
forming an electrode film on said gap film,
forming a first photoresist layer on said electrode film,
forming an intermediate layer on said first photoresist layer,
forming a second photoresist layer in a thickness of 1 μm or below on said intermediate layer,
exposing and developing said second photoresist layer via a given mask so as to expose said intermediate layer, to fabricate a photoresist pattern,
partially etching said intermediate layer via said photoresist pattern as a mask by a reactive ion etching method using a chlorine-based gas so as to expose said first photoresist layer, to fabricate an etching mask,
partially etching said first photoresist layer via said etching mask so as to expose said electrode film, to fabricate a photoresist frame in self-alignment,
forming said second magnetic film in said photoresist frame by an electroplating method using said electrode film,
removing said etching mask and said photoresist frame, and
partially etching said electrode film, said gap film and said first magnetic film via said second magnetic film as a mask, to fabricate said writing magnetic pole portion in self-alignment.

2. The fabricating method as defined in claim 1, wherein said chlorine-based gas is at least one of Cl2 and BCl3.

3. The fabricating method as defined in claim 1, further comprising the step of washing out said etching mask with extrapure water after fabricating said etching mask and before fabricating said photoresist frame.

4. The fabricating method as defined in claim 1, further comprising the step of forming a protective electrode film between said electrode film and said first photoresist film.

5. The fabricating method as defined in claim 4, wherein the thickness of said protective electrode film is set within 3–20 nm.

6. The fabricating method as defined in claim 4, wherein said protective electrode film is made of a magnetic material including Ni and Fe.

7. The fabricating method as defined in claim 4, wherein the thickness of said electrode film is set within 30–100 nm.

8. The fabricating method as defined in claim 4, wherein said electrode film is made of a magnetic material including Co, Ni and Fe.

9. The fabricating method as defined in claim 4, wherein said photoresist frame is removed by ashing.

10. A method for fabricating a thin film magnetic head which comprises a writing magnetic pole portion including a first magnetic film, a gap film and a second magnetic film, comprising the steps of:

forming said first magnetic film on a given underfilm,
forming said gap film on said first magnetic film,
forming an electrode film on said gap film,
forming a first photoresist layer on said electrode film,
forming an intermediate layer on said first photoresist layer by a sputtering method so that the surface temperature of said intermediate layer is set to 140° C. or below,
forming a second photoresist layer in a thickness of 1 μm or below on said intermediate layer,
exposing and developing said second photoresist layer via a given mask so as to expose said intermediate layer, to fabricate a photoresist pattern, partially etching said intermediate layer via said photoresist pattern as a mask so as to expose said first photoresist layer, to fabricate an etching mask, partially etching said first photoresist layer via said etching mask so as to expose said electrode film, to fabricate a photoresist frame in self-alignment, forming said second magnetic film in said photoresist frame by an electroplating method using said electrode film, removing said etching mask and said photoresist frame, and partially etching said electrode film, said gap film and said first magnetic film via said second magnetic film as a mask, to fabricate said writing magnetic pole portion in self-alignment.

11. The fabricating method as defined in claim 10, wherein at the formation of said intermediate layer, a distance between said underfilm and a target to be sputtered is set within 150–350 mm.

12. The fabricating method as defined in claim 10, further comprising the step of forming a protective electrode film between said electrode film and said first photoresist film.

13. The fabricating method as defined in claim 12, wherein a thickness of said protective electrode film is set within 3–20 nm.

14. The fabricating method as defined in claim 12, wherein said protective electrode film is made of a magnetic material including Ni and Fe.

15. The fabricating method as defined in claim 12, wherein a thickness of said electrode film is set within 30–100 nm.

16. The fabricating method as defined in claim 12, wherein said electrode film is made of a magnetic material including Co, Ni and Fe.

17. The fabricating method as defined in claim 10, wherein said photoresist frame is removed by ashing.

18. The fabricating method as defined in claim 10, wherein said intermediate layer is removed by a reactive ion etching method using a chlorine-based gas.

19. The fabricating method as defined in claim 18, wherein said chlorine-based gas is at least one of Cl2 and BCl3.

20. The forming method as defined in claim 18, further comprising the step of washing out said etching mask with extrapure water after fabricating said etching mask and before fabricating said photoresist frame.

* * * * *